(12) United States Patent
Allen

(10) Patent No.: US 10,324,486 B1
(45) Date of Patent: Jun. 18, 2019

(54) HITCH INSERT COUPLING AND RELEASE MECHANISM

(71) Applicant: The R.A. Allen Company, Inc., Portsmouth, NH (US)

(72) Inventor: Alex Allen, Portsmouth, NH (US)

(73) Assignee: The R.A. Allen Company, Inc., Portsmouth, NH (US)

( * ) Notice: Subject to any disclaimer, the term of this patent is extended or adjusted under 35 U.S.C. 154(b) by 0 days.

(21) Appl. No.: 16/033,375

(22) Filed: Jul. 12, 2018

(51) Int. Cl.
*G05G 1/02* (2006.01)
*B60R 9/06* (2006.01)
*B60D 1/52* (2006.01)

(52) U.S. Cl.
CPC ............ *G05G 1/02* (2013.01); *B60D 1/52* (2013.01); *B60R 9/06* (2013.01)

(58) Field of Classification Search
CPC .............. B60D 1/52; B60R 9/06; G05G 1/02
USPC ........................................................ 280/504
See application file for complete search history.

(56) References Cited

U.S. PATENT DOCUMENTS

| 3,981,517 | A | * | 9/1976 | Crochet, Sr. | ............ | B60D 1/26 |
| | | | | | | 280/478.1 |
| 7,066,483 | B2 | * | 6/2006 | Makos | ................... | B60D 1/485 |
| | | | | | | 280/507 |
| 9,376,063 | B2 | | 6/2016 | Hein et al. | | |

* cited by examiner

*Primary Examiner* — Joseph M Rocca
*Assistant Examiner* — Felicia L. Brittman
(74) *Attorney, Agent, or Firm* — Pierce Atwood LLP; Kevin M. Farrell; Christopher A. Baxter

(57) ABSTRACT

A button assembly that couples and releases a hitch insert to and from a hitch is described. A button of the button assembly may be configured to be pressed to a degree that allows the hitch insert to be inserted into and removed from a hitch. However, the button assembly may be configured to prevent a user's finger (or other extremity) from entering an aperture of the hitch insert that accommodates the button. For example, in a pressed orientation, a surface of the button that a user contacts may remain flush (or substantially flush) with an outer surface of the hitch insert.

17 Claims, 5 Drawing Sheets

HITCH INSERT COUPLING AND RELEASE MECHANISM

BACKGROUND

Many vehicles are outfitted with hitches configured to receive various hitch inserts, such as hitch inserts for towing trailers, hitch inserts of bike racks, etc. Various mechanisms for coupling a hitch insert to a hitch exist. The mechanisms may be integrated as part of the hitch insert or may be detachable from the hitch insert. A detachable mechanism includes a pin or other elongated member (e.g., a bolt) for insertion through a hitch and hitch insert. Once inserted, the pin may be fitted with a nut, cotter pin, lock, or the like to secure the pin in place, thereby coupling the hitch insert to the hitch.

SUMMARY

The present disclosure provides a button assembly that may be used to couple and release a hitch insert to and from a hitch. A button of the button assembly may be configured to be pressed to a degree that allows the hitch insert to be inserted into and removed from a hitch. However, the button assembly may be configured to prevent a user's finger (or other extremity) from entering an aperture of the hitch insert that accommodates the button. For example, in a pressed orientation, a surface of the button that a user contacts may remain flush (or substantially flush) with an outer surface of the hitch insert. Such a configuration prevents (or at least decreases) the chance of a user extremity getting caught between the hitch insert and a hitch during installation and removal of the hitch insert.

An aspect of the present disclosure relates to a button assembly for a vehicle hitch insert. The button assembly includes a rigid structure coupled to an elongated member of the vehicle hitch insert. The button assembly also includes an elongated member coupled to the rigid structure and the elongated member of the vehicle hitch insert. The button assembly additionally includes a button coupled to the elongated member of the hitch insert. The button has a surface that is flush with an outer surface of the elongated member of the vehicle hitch insert when the button is in a pressed configuration.

BRIEF DESCRIPTION OF DRAWINGS

For a more complete understanding of the present disclosure, reference is now made to the following description taken in conjunction with the accompanying drawings.

DETAILED DESCRIPTION

The present disclosure relates to a button assembly for coupling and releasing a hitch insert to and from a hitch. A hitch insert according to the present disclosure may be configured as part of a bike rack, may be configured to tow a trailer, or may be configured otherwise. A button of the button assembly may be configured to prevent a user's finger (or other extremity) from getting caught between the hitch insert and a hitch during installation and removal of the hitch insert. Thus, it will be appreciated that at least one benefit of the present disclosure is the decreased risk of user harm during installation and removal of the hitch insert. The button assembly of the present disclosure is also beneficial because it provides quicker installation and removal of a hitch insert as compared to at least some known mechanisms (e.g., the use of a pin or bolt to couple a hitch insert to a hitch). Other benefits and advantages of the present disclosure will be apparent to one skilled in the art.

Figure 1:
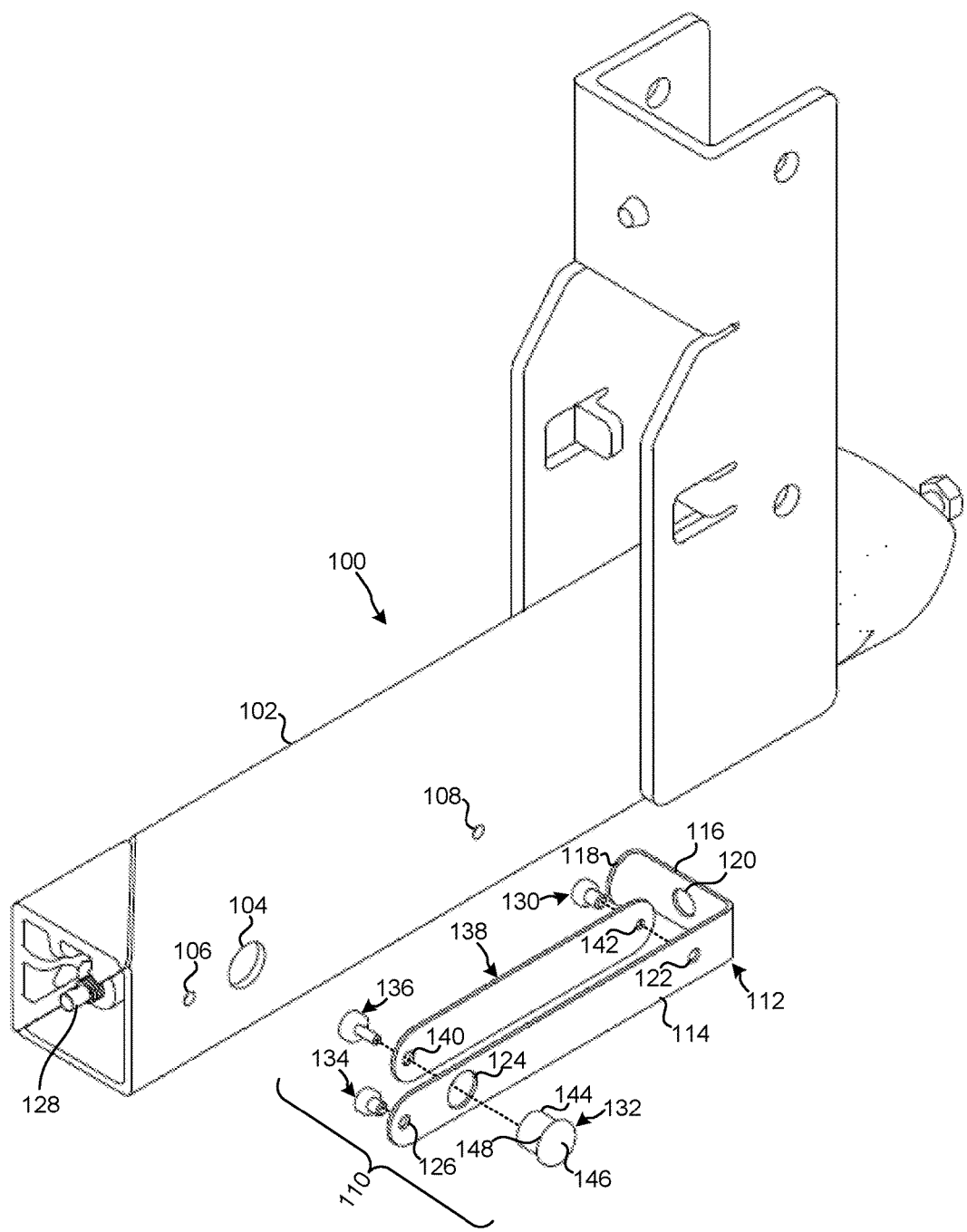
FIG. 1 is a perspective view of a hitch insert and a disassembled button assembly according to embodiments of the present disclosure.

FIG. 1 illustrates a hitch insert 100 with a disassembled button assembly 110. The hitch insert 100 may include an elongated member 102, such as an elongated hollow tube, that is configured to be inserted into a hitch of a vehicle (not illustrated). The elongated member 102 may include various sides (e.g., four sides as illustrated). One of the sides may be configured with three apertures (104/106/108).

The dissembled button assembly 110 may include a rigid structure 112. The rigid structure 112 may include two elongated portions (114/116). A first elongated portion 114 of the rigid structure 112 may be configured to extend along a side of the elongated member 102 of the hitch insert 100, when installed. A second elongated portion 116 of the rigid structure 112 may extend between two sides of the elongated member 102 of the hitch insert 100, when installed. The second elongated portion 116 of the rigid structure 112 may extend along a width of the elongated member 102 of the hitch insert 100, such that the second elongated portion 116 communicates with two sides of the elongated member 102 of the hitch insert 100. The second elongated portion 116 of the rigid structure 112 may include an end portion 118 that extends along a side of the elongated member 102 of the hitch insert 100. In an example, the end portion 118 of the second elongated portion 116 of the rigid structure 112 may extend along a first side of the elongated member 102 of the hitch insert 100 and the first elongated portion 114 of the rigid structure 112 may extend along a second side of the elongated member 102 of the hitch insert 100, with the first and second sides of the elongated member 102 of the hitch insert 100 being parallel with respect to each other. In other words, the end portion 118 of the second elongated portion 116 of the rigid structure 112 may be configured to be parallel (or substantially parallel) with respect to the first elongated portion 114 of the rigid structure 112. The first elongated portion 114 of the rigid structure 112 may be configured perpendicular (or substantially perpendicular) with respect to the second elongated portion 116 of the rigid structure 112.

The rigid structure 112 may include various apertures (120/122/124/126). One aperture 124 may be configured to receive an elongated portion 144 of a button 132 of the button assembly 110. Two of the apertures (122/126) may be configured to receive elongated portions of fasteners (130/134). The fasteners (130/134) may couple the rigid structure 112 to a side of the elongated member 102 of the hitch insert 100. For example, the fastener 130 may extend through the aperture 122 of the rigid structure 112 and couple to the elongated member 102 of the hitch insert 100 at the aperture 108. For further example, the fastener 134 may extend through the aperture 126 of the rigid structure 112 and couple to the elongated member 102 of the hitch insert 100 at the aperture 106. The fasteners (130/134) may be screws, bolts, or other types of fasteners.

The hitch insert 100 may include an elongated member 128 that extends along a cavity of the elongated member 102. The elongated member 128 may be part of a mechanism for decreasing movement of the hitch insert 100 within a hitch. An aperture 120 may be located in the second elongated portion 116 of the rigid structure 112. The elongated member 128 may extend through the aperture 120.

The button assembly 110 may also include an elongated member 138. The elongated member 138 may be configured to extend at least partially along the first elongated portion 114 of the rigid structure 112. The elongated member 138 may include multiple apertures (140/142). The aperture 142 may be configured to receive an elongated portion of the fastener 130. For example, the fastener 130 may extend through the aperture 142 of the elongated member 138, then through the aperture 122 of the rigid structure 112, and then couple to the elongated member 102 of the hitch insert 100 at the aperture 108. The aperture 140 may be configured to receive an elongated portion of a fastener 136, which couples the elongated member 138 to the button 132. When the fastener 136 is extended through the aperture 140 and coupled to the button 132, a surface of the elongated portion 144 of the button 132 may be flush to a surface of the elongated member 138 (as illustrated in FIGS. 3 and 5).

The button 132 includes the elongated portion 144, a surface 146, and a beveled edge 148.

Figure 2:
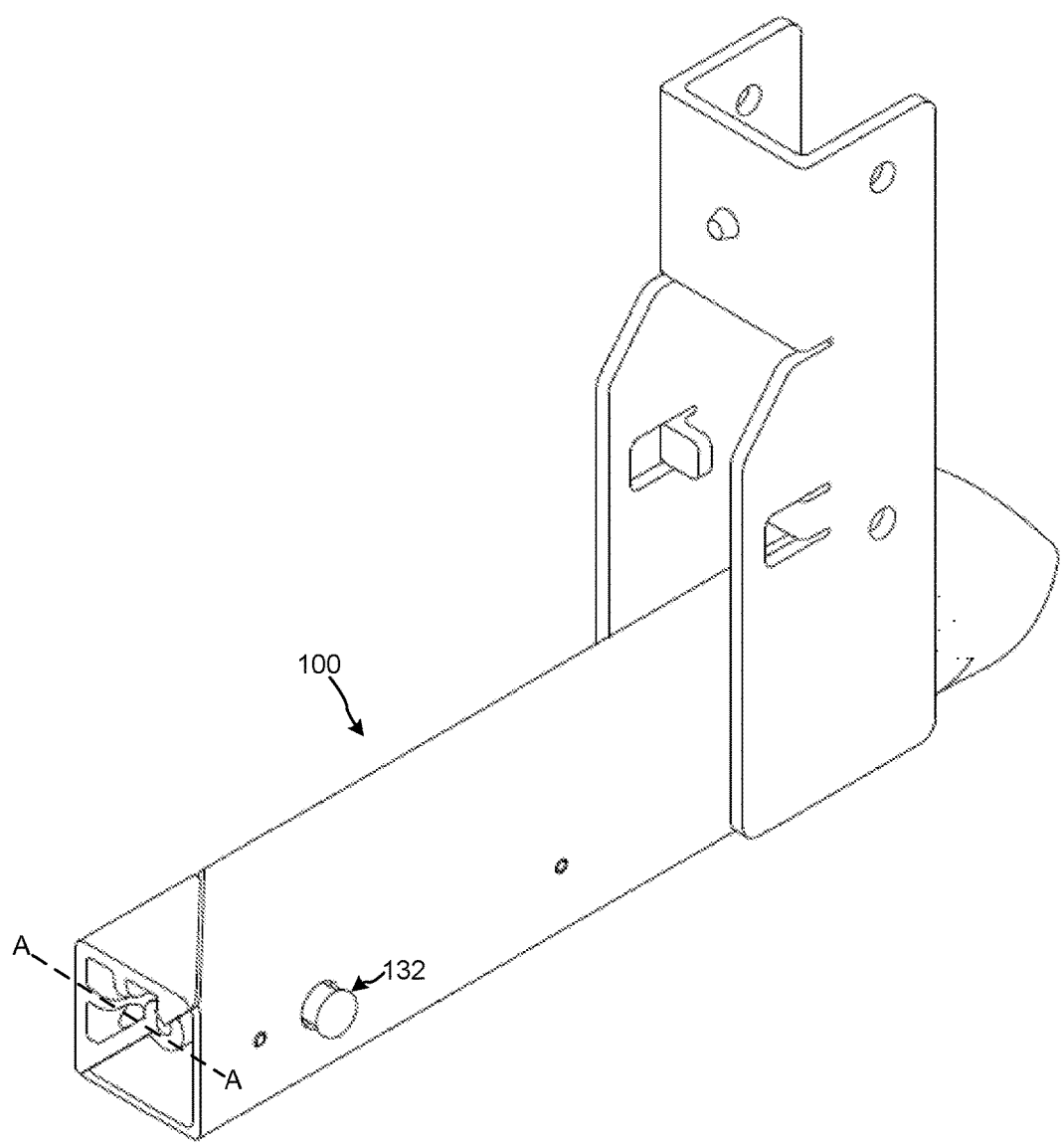
FIG. 2 is a perspective view of a hitch insert with a button assembly in an extended configuration according to embodiments of the present disclosure.
Figure 3:
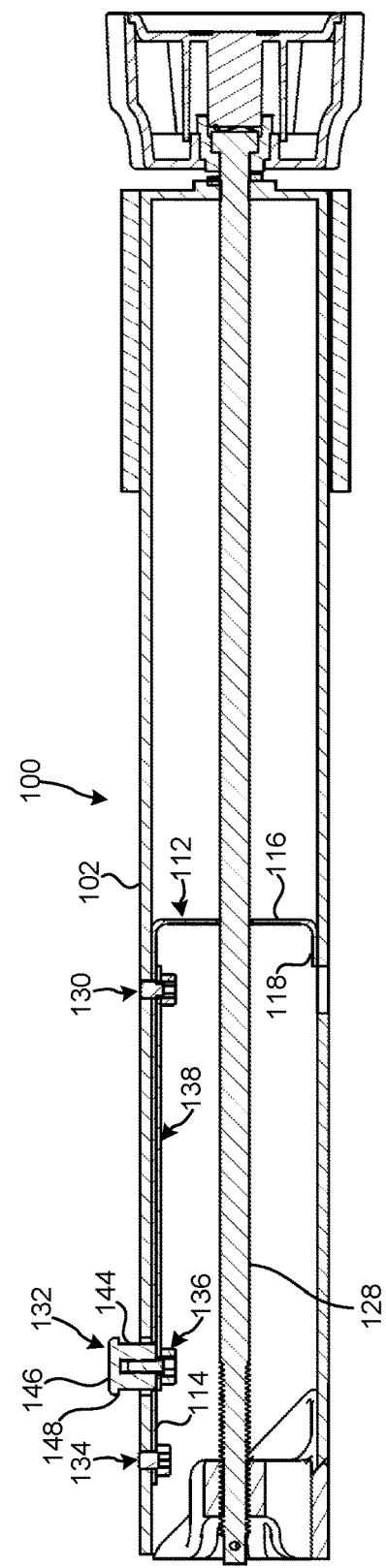
FIG. 3 is a top cross-section view of the hitch insert of FIG. 2 taken along line A-A according to embodiments of the present disclosure.

When the button assembly 110 is installed on the hitch insert 100 and the button 132 is not pressed, the button 132 may extend outwardly from the hitch insert 100 (as illustrated in FIGS. 2 and 3). The elongated portion 144 of the button 132 may have a length configured to cause the surface 146 of the button 132 to be planar (or substantially planar) with respect to an outer surface of a hitch (not illustrated) when the button 132 is not pressed. Thus, one skilled in the art will appreciate that the beveled edge 148 of the button 132 may reside within an aperture of a hitch (not illustrated) when the hitch insert 100 is inserted into a hitch and the button 132 is not pressed.

Figure 4:
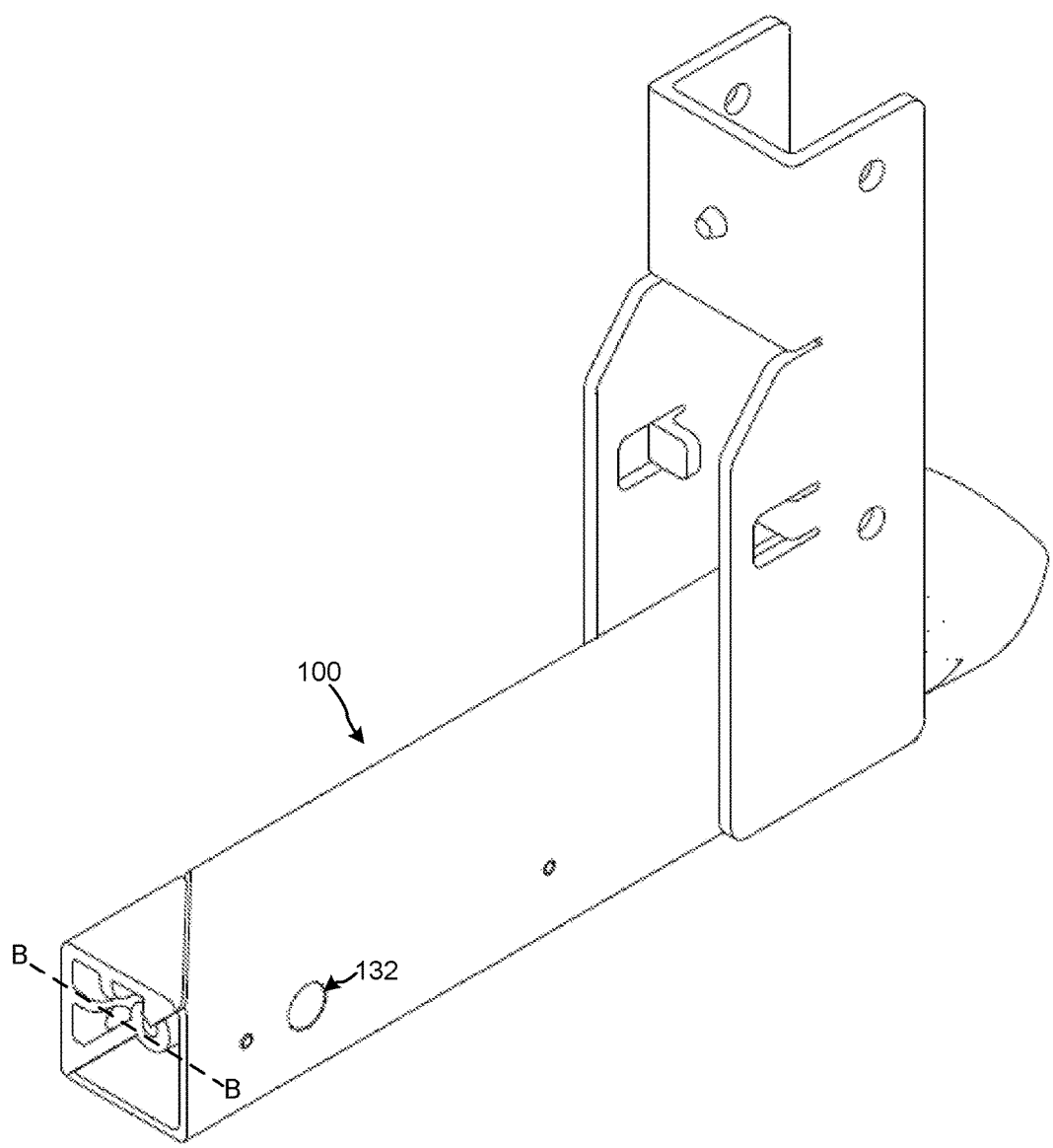
FIG. 4 is a perspective view of a hitch insert with a button assembly in a pressed configuration according to embodiments of the present disclosure.
Figure 5:
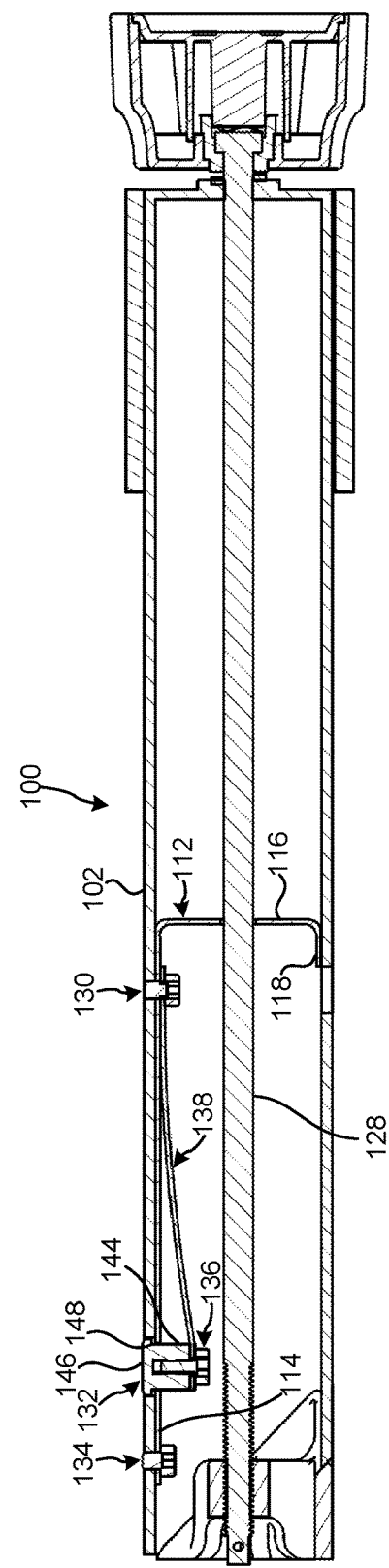
FIG. 5 is a top cross-section view of the hitch insert of FIG. 4 taken along line B-B according to embodiments of the present disclosure.

When the button 132 is in a pressed configuration (e.g., due to a user pressing on the surface 146 of the button 132), the surface 146 of the button 132 may be planar with a side of the elongated member 102 of the hitch insert 100 (as illustrated in FIGS. 4 and 5). When a user presses the button 132, the elongated member 138 of the button assembly 110 may bend (as illustrated by a comparison of FIGS. 3 and 5). The elongated member 138 of the button assembly 110 may be comprised of a metal that is bendable by a user without undue force but that is nonetheless biased to remain planar (or substantially planar) when a user is not exerting force on the button 132. Such characteristic of the elongated member 138 enables the button 132 to couple the hitch insert 100 to a hitch when the button 132 is not acted on by a user.

When the button 132 is in a completely pressed configuration (illustrated in FIGS. 4 and 5), a surface of the beveled edge 148 may abut a surface of the rigid structure 112 (e.g., a surface of the rigid structure 112 abutting an inner surface of the side of the elongated member 102 of the hitch insert 100 to which the rigid structure 112 is coupled). For example, the beveled edge 148 may abut a surface of the first elongated portion 114 of the rigid structure 112 when the button 132 is completely pressed. This configuration of the button 132 and the rigid structure 112 enables a user to insert and remove the hitch insert 100 from a hitch with minimal to no risk of the user getting its finger (or other extremity acting upon the surface 146 of the button 132) caught between the hitch insert 100 and a hitch.

While the present disclosure has been particularly described in conjunction with specific embodiments, it is evident that many alternatives, modifications, and variations will be apparent to those skilled in the art in light of the foregoing description. It is therefore contemplated that the appended claims will embrace any such alternatives, modifications, and variations as falling within the true spirit and scope of the present disclosure.

What is claimed is:

1. A button assembly for a vehicle hitch insert, comprising:
   a rigid structure coupled to a first elongated member of the vehicle hitch insert;
   a second elongated member coupled to the rigid structure and the first elongated member; and
   a button coupled to the second elongated member, the button having a surface configured to be flush with an outer surface of the first elongated member when the button is in a pressed configuration, the button further including a beveled edge configured to contact a surface of the rigid structure when the button is in the pressed configuration.

2. The button assembly of claim 1, wherein the rigid structure includes an aperture through which a third elongated member of the vehicle hitch insert extends, the third elongated member being configured to reduce movement of the vehicle hitch insert within a hitch.

3. The button assembly of claim 1, further comprising:
   a fastener,
   wherein the first elongated member of the vehicle hitch insert includes a first aperture,
   wherein the rigid structure includes a second aperture,
   wherein the second elongated member includes a third aperture,
   wherein the fastener extends through the third aperture of the second elongated member, extends through the second aperture of the rigid structure, and couples to the first elongated member of the vehicle hitch insert at the first aperture.

4. The button assembly of claim 1, wherein:
   the first elongated member of the vehicle hitch insert includes a first aperture;
   the rigid structure includes a second aperture; and
   the button includes an elongated portion that extends through the first aperture of the first elongated member of the vehicle hitch insert, extends through the second aperture of the rigid structure, and contacts a surface of the second elongated member.

5. The button assembly of claim 4, wherein the elongated portion of the button has a length that configures the surface of the button to be substantially planar with an outer surface of a hitch when the button is not in the pressed configuration.

6. The button assembly of claim 1, wherein the beveled edge is configured to reside within an aperture of a vehicle hitch when the button is not in the pressed configuration.

7. The button assembly of claim 1, wherein:
   the second elongated member is planar when the button is not in the pressed configuration; and
   the second elongated member is bent when the button is in the pressed configuration.

8. The button assembly of claim 1, wherein:
   the surface of the button is configured to be substantially planar with an outer surface of the first elongated member of the vehicle hitch insert when the button is in the pressed configuration.

9. The button assembly of claim 1, wherein the rigid structure includes two parallel portions, each of the two parallel portions contacting a different inner surface of the first elongated member of the vehicle hitch insert.

10. A vehicle hitch insert, comprising:
a first elongated member configured for insertion into a vehicle hitch;
a first structure coupled to an inner surface of the first elongated member of the vehicle hitch insert;
a button coupled to the first structure, the button having a beveled edge that contacts a surface of the first structure when the button is in a pressed configuration; and
a second elongated member that extends through the first elongated member, the second elongated member being configured to reduce movement of the vehicle hitch insert within the vehicle hitch,
wherein the first structure includes an aperture through which the second elongated member extends.

11. The vehicle hitch insert of claim 10, further comprising:
a second structure coupled to the first elongated member of the vehicle hitch insert and the button.

12. The vehicle hitch insert of claim 11, further comprising:
a fastener,
wherein the first elongated member includes a first aperture,
wherein the first structure includes a second aperture,
wherein the second structure includes a third aperture,
wherein the fastener extends through the third aperture of the second structure, then extends through the second aperture of the first structure, and then couples to the first elongated member at the first aperture.

13. The vehicle hitch insert of claim 11, wherein:
the first elongated member includes a first aperture;
the first structure includes a second aperture; and
the button includes an elongated portion that extends through the first aperture of the first elongated member, extends through the second aperture of the first structure, and contacts a surface of the second structure.

14. The vehicle hitch insert of claim 13, wherein the elongated portion of the button has a length that configures a surface of the button to be substantially planar with an outer surface of a vehicle hitch when the button is not in the pressed configuration.

15. The vehicle hitch insert of claim 10, wherein the beveled edge is configured to reside within an aperture of a vehicle hitch when the button is not in the pressed configuration.

16. The vehicle hitch insert of claim 11, wherein:
the second structure is planar when the button is not in the pressed configuration; and
the second structure is bent when the button is in the pressed configuration.

17. The vehicle hitch insert of claim 10, wherein:
the button includes a surface that is contactable by a user; and
the surface is configured to be substantially planar with an outer surface of the first elongated member when the button is in the pressed configuration.

* * * * *